United States Patent [19]
Logan et al.

[11] Patent Number: 5,690,354
[45] Date of Patent: Nov. 25, 1997

[54] AIR BAG MODULE

[75] Inventors: Jeffrey Allen Logan, Union; John Clifford Hattery, Jr., Dublin; John Paul Sparkman, Dayton; Graham Thornton Spencer, Tipp City; Margaret Ann Fisher, Dayton, all of Ohio

[73] Assignee: General Motors Corporation, Detroit, Mich.

[21] Appl. No.: 618,322

[22] Filed: Mar. 19, 1996

[51] Int. Cl.$^6$ ................................................ B60R 21/20
[52] U.S. Cl. ........................... 280/728.2; 280/728.3; 280/730.2; 280/736
[58] Field of Search .................. 280/728.3, 728.2, 280/730.2, 730.1, 732, 736, 740, 741, 742, 743.1, 728.1

[56] References Cited

U.S. PATENT DOCUMENTS

| | | | |
|---|---|---|---|
| 3,666,289 | 5/1972 | Magyar | 280/740 |
| 3,690,695 | 9/1972 | Jones, Sr. | 280/741 |
| 4,153,273 | 5/1979 | Risko | 280/728.2 |
| 4,394,033 | 7/1983 | Goetz et al. | 280/736 |
| 4,536,008 | 8/1985 | Brown, Jr. | 280/730.1 |
| 5,112,079 | 5/1992 | Haland et al. | 280/730.2 |
| 5,445,407 | 8/1995 | Lotspih | 280/728.2 |
| 5,468,012 | 11/1995 | Mihm | 280/728.2 |
| 5,498,030 | 3/1996 | Hill et al. | 280/743.1 |
| 5,533,750 | 7/1996 | Karlow et al. | 280/728.2 |
| 5,553,887 | 9/1996 | Karlow et al. | 280/728.3 |

FOREIGN PATENT DOCUMENTS

| | | | |
|---|---|---|---|
| 30 07 370 | 9/1988 | Germany | 280/728.3 |
| 2281259 | 3/1995 | United Kingdom | 280/741 |

OTHER PUBLICATIONS

U.S. Patent Application No. 08/609,061, filed Feb. 29, 1996, by Spencer et al.

*Primary Examiner*—Brian L. Johnson
*Assistant Examiner*—Peter C. English
*Attorney, Agent, or Firm*—Kathryn A. Marra

[57] ABSTRACT

An air bag module includes an inflator for generating gas and an air bag deployable upon generation of gas by the inflator. The module further includes a container for housing the air bag and inflator therein. Preferably, the container is integrally molded as one piece and includes at least two spaced apart integral living hinges. Preferably, the container has a clamshell construction including a first half and a second half pivotally connected to each other by a closure hinge portion. The container preferably includes deployment end portions opposite the closure hinge portion which are releasably connected to each other. Preferably, at least one of the deployment end portions is pivotally connected to the container.

10 Claims, 7 Drawing Sheets

1

AIR BAG MODULE

This invention relates to an air bag module for use in a vehicle.

BACKGROUND OF THE INVENTION

Conventional air bag module designs require a rigid housing which is anchored to a vehicle body and which houses and supports an inflator and a folded air bag. The housing is typically formed of a sturdy rigid material, such as a stamped, drawn or cast metal. The air bag module also typically includes a separate plastic molded cover attached to the housing. The cover typically includes weakened integrally formed tear seams which break open to permit deployment of the air bag therethrough. Prior art covers are typically generally flat due to difficulty in manufacturing when the molded shape of the cover includes complex curvatures resulting in a cover which is difficult to remove from the mold. In addition the prior art covers are difficult to stretch over the air bag and around or within a housing for attachment thereto. Thus, prior art modules have the shortcoming of requiring multiple components fastened together to house the inflator and air bag therein.

Air bag modules are now being contemplated for use in vehicle locations having narrow space constraints, such as vehicle seats, doors, roofs or other side structure. Thus, it is continually desirable to reduce the size and weight of the air bag module to improve packaging.

SUMMARY OF THE INVENTION

This invention provides an improved air bag module which preferably is easy to manufacture and assemble. The air bag module preferably includes a molded container for housing the air bag and inflator and having a shape which is easy to manufacture by molding and easily removable from the mold. Advantageously, this invention eliminates the rigid housing to preferably provide a lightweight module which is easily adaptable for packaging in vehicle locations with narrow or odd-shaped packaging constraints, such as a vehicle seat.

These advantages are accomplished in a preferred embodiment of the invention by providing an air bag module including an inflator for generating gas, an air bag deployable upon generation of gas by the inflator, and a container for housing the air bag and inflator therein. Preferably, the container is integrally molded as one piece and includes at least two spaced apart integral living hinges. The container is preferably a clamshell container including first and second halves and a bendable closure hinge portion pivotally connecting the first and second halves. Preferably, the clamshell container includes an additional hinge portion located on one of the halves, the hinges enabling movement of the clamshell container between an open condition for receiving the air bag and inflator therein and a closed condition defining a substantially enclosed volume for housing the air bag and inflator.

In a preferred form, the first and second halves of the clamshell container each include a deployment end portion opposite the closure hinge portion with deployment end portions being releasably connected to each other. Upon air bag deployment, the deployment end portions break apart from each other to permit deployment of the air bag therebetween. The deployment end portions are preferably connected to each other by heat staking or ultrasonic welding. It is preferred that at least one of the deployment end portions is hingedly connected to the clamshell container by a deployment hinge portion. Preferably, the deployment hinge portion is stronger than the releasable connection between the deployment end portions such that upon air bag deployment, the inflating air bag breaks apart the deployment end portions and the deployment hinge portion remains intact and permits rotation of the deployment end portion.

In accordance with another preferred aspect of the invention, a method of making an air bag module includes the steps of molding a one-piece container for housing the air bag and inflator, the container being molded in an open condition having a least two integral living hinge portions enabling all portions of the container to have a positive die angle for easy removal from a mold, and the hinge portions pivotally connecting the container for movement to a closed condition defining a substantially enclosed volume.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
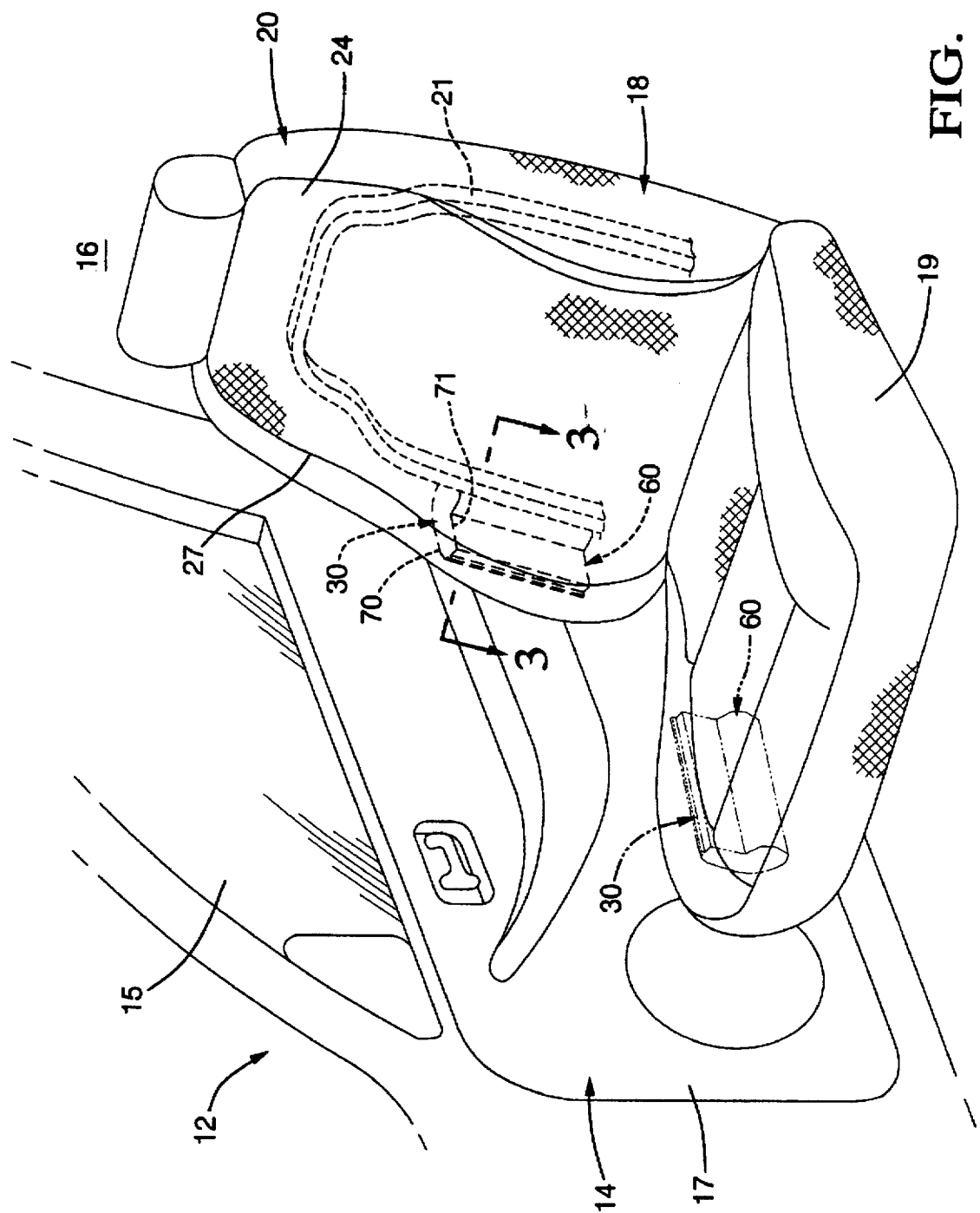
FIG. 1 is a perspective view of a vehicle interior partially broken away and including an air bag module in an undeployed condition.

Referring to FIG. 1, it is seen that a vehicle 12 includes a door 14 having a movable window is mounted thereon. An interior 16 of the vehicle includes an inner door panel 17 and a seat 18 for a vehicle occupant (not shown), the seat 18 having a seat bottom 19 and an upper seat back 20. The seat back 20 includes a rigid seat frame 21, preferably being metal, and encompassed within the seat back The seat back 20 is preferably formed of a foam material 23 covered by fabric seat material 24. The seat back 20 preferably includes a vertically extending frangible seat seam 27 proximate the inner door panel 17.

Figure 5:
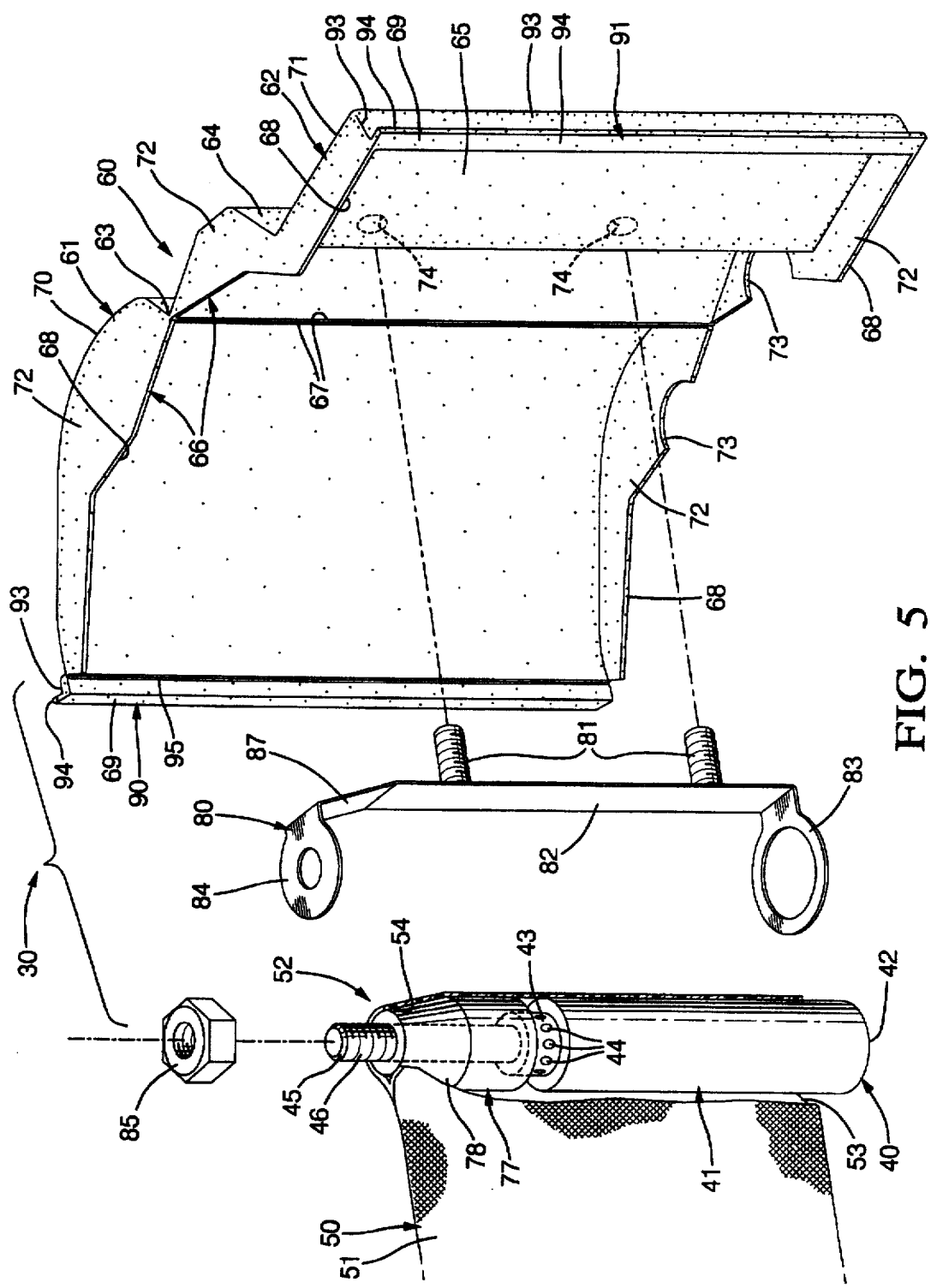
FIG. 5 is a partially exploded perspective view of the module.

FIG. 5 best illustrates the component parts of a complete air bag module 30 located within the seat back 20. The module 30 generally includes an inflator 40, an air bag 50 for inflation upon generation of gas by the inflator 40, a clamshell container 60 for housing the inflator 40 and air bag 50 therein, and a mounting bracket 80 for mounting the module 30 to the seat frame 21.

As best shown in FIG. 5, the inflator 40 may be of any conventional construction which contains chemicals for igniting to generate gas for discharge upon the existence of predetermined vehicle 12 conditions. The inflator 40 preferably has a hybrid construction including an axially elongated cylindrical inflator body 41 having a plain end 42 and an opposite discharge end 43 including ports 44 through which inflator gas is discharged in a thrust neutral manner to inflate the air bag 50. An axially elongated inflator rod 45 having a threaded end portion 46 preferably extends from the discharge end 43 of the inflator 40 for attachment of the mounting bracket 80, as described further hereinafter. The elongated axis of the inflator 40 is preferably generally vertical and generally parallel with the seat back 20 when the module 30 is mounted in the seat 18.

As best shown in FIG. 5, the air bag 50 is 20 made of any conventional fabric material which is suitable for air bag construction. The air bag 50 includes a folded main body portion 51 which is inflatable to a tubular shape upon the discharge of inflator gas. The air bag 50 also includes a neck portion 52 preferably being an extension of the air bag fabric material. The neck portion 52 includes first and second opposing side openings 53, 54 sized for receiving the inflator 40 therethrough. Preferably, the first side opening 53 is sized larger than the second side opening 54. Preferably, the first side opening 53 is sized for receiving the larger plain end 42 of the inflator 40 therein. Also preferably, the second side opening 54 is tapered and is sized for an interference fit with a tapered spacer 77 disposed on the inflator 40, as described further hereinafter. The neck portion 52 also defines an inner air bag opening through which inflator gas passes to inflate the main body portion 51 of the air bag 50. It will be appreciated that the air bag 50 including the main body portion 51 and the neck portion 52 may be made of a single piece of fabric or several fabric panels joined together.

Figure 2:
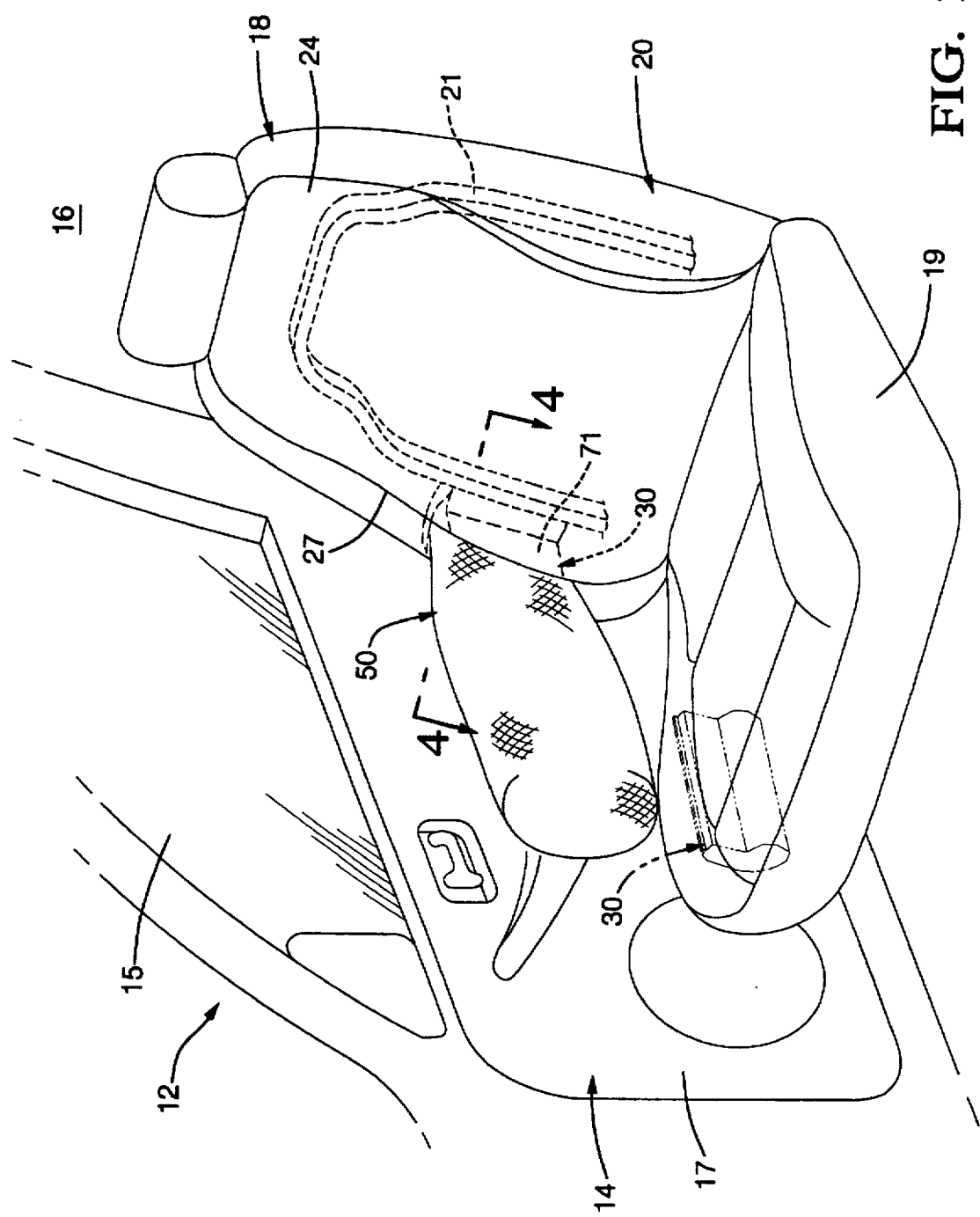
FIG. 2 is a view similar to FIG. 1 but showing the air bag module in a deployed condition.

The main body portion 51 of the air bag 50 preferably includes upper and lower longitudinally extending folds (not shown) such that the main body portion 51 is folded to a height approximately equal to a height of the neck portion 52. The main body portion 51 is then preferably folded into a plurality of accordion-style pleat folds (not shown) for storage within the clamshell container 60. It will be appreciated, however, that other fold arrangements designed to conform to the shape of the clamshell container 60 are also contemplated. While the air bag 50 in FIG. 2 is preferably shown as a longitudinally elongated air bag 50 positioned for protecting the torso portion of an occupant (not shown), it will be appreciated that the air bag 50 may also be positioned higher in the seat back 20 to protect the head portion of the occupant or may have a greater total height for protection of both the torso and head portion of the occupant.

Figure 6:
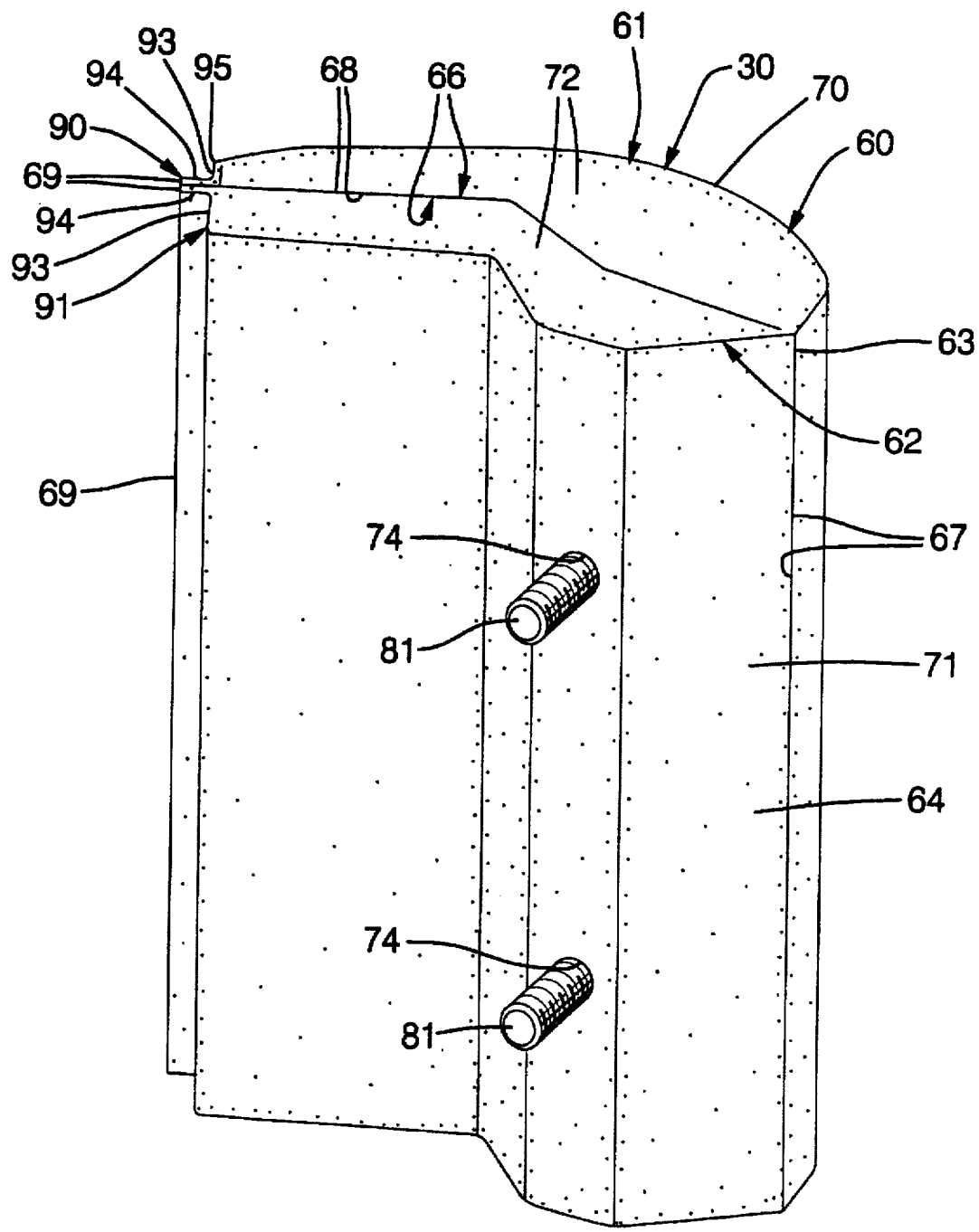
FIG. 6 is a perspective view showing the air bag module in an assembled condition.

As best shown in FIGS. 5 and 6, the module 30 further includes a foldable clamshell container 60 which houses the folded air bag 50 prior to inflation. Advantageously, the clamshell container 60 also preferably houses the inflator 40 and the mounting bracket 80 prior to air bag deployment, thus eliminating the need for a rigid housing and a separate cover. As best shown in FIG. 5, the clamshell container 60 includes a first half 61 and a second half 62 and an integral, bendable, thin closure hinge portion 63 pivotally connecting the first and second halves 61, 62.

As best shown in FIG. 5, the clamshell container 60 has a generally planar, open condition in which the first and second halves 61, 62 each extend outwardly from the closure hinge portion 63. The first and second halves 61, 62 are pivotally connected by the closure hinge portion 63. The closure hinge portion 63 preferably permits pivotal movement of the first and second halves 61, 62 at least 180 degrees relative each other. Thus, the clamshell container 60 is foldable to a closed condition in which the first and second halves 61, 62 are positioned atop each other as best shown in FIGS. 3 and 6.

As best shown in FIG. 5, the clamshell container 60 has an outer surface 64 and an inner surface 65. The first and second halves 61, 62 of the clamshell container 60 each preferably have a generally half-cylindrical shape further defined by perimetric edges 66 including hinged edges 67 integrally attached to the closure hinge portion 63, free end edges 68 and deployment edges 69.

Figure 3:
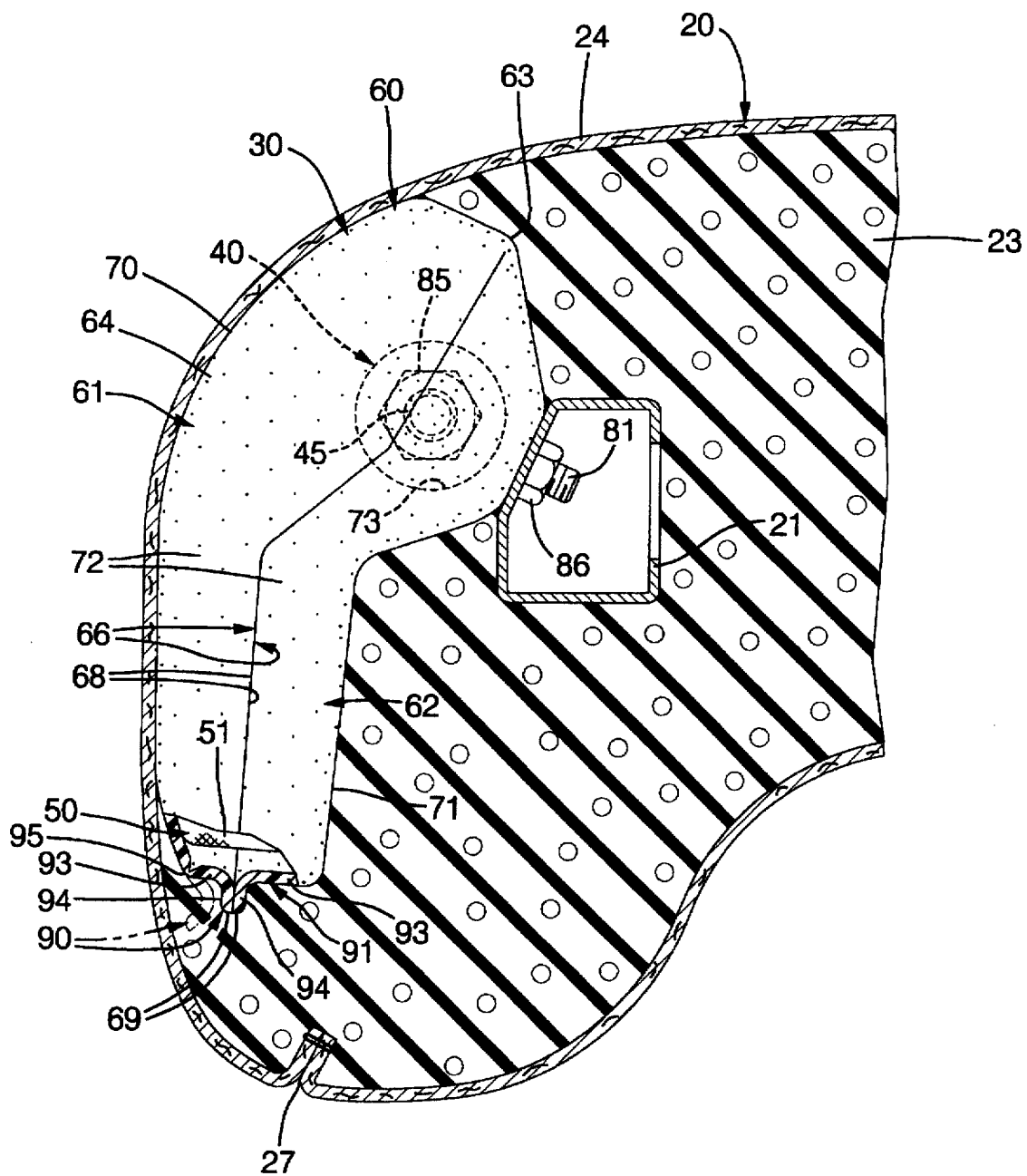
FIG. 3 is a section as viewed along line 3—3 of FIG. 1 and showing the air bag module in the undeployed condition and showing the initial opening of a clamshell container in phantom.

As best shown in the closed condition in FIGS. 3 and 6, the clamshell container 60 includes an outboard side wall 70 on the first half 61, and an inboard side wall 71 on the second half 62, and two pairs of opposing end walls 72. Preferably, the lower pair of end walls 72 cooperatively defines an inflator opening 73 through which an electrical connector (not shown) for the inflator 40 extends when the module 30 is assembled. The inboard side wall 71 on the second half 62 preferably includes a set of fastener apertures 74 for receiving mounting fasteners 81 of the mounting bracket 80 therethrough, as described further hereinafter. The walls 70, 71, 72 of the clamshell container 60 cooperatively define a substantially enclosed volume in which the air bag 50, inflator 40 and mounting bracket 80 are stored prior to air bag deployment.

The clamshell container 60 includes a first deployment end portion 90 preferably located longitudinally forward on the first half 61 and a second deployment end portion 91 preferably located longitudinally forward on the second half 62. The first and second deployment end portions 90, 91 preferably each include a laterally extending portion 93 and an outwardly projecting lip portion 94. The lip portions 94 of the deployment end portions 90, 91 are releasably connected to each other prior to air bag deployment. Upon air bag inflation, the air bag 50 forcibly separates the lip portions 94 of the first and second deployment end portions 90, 91 from each other and deploys therebetween. Preferably, the lip portions 94 of the deployment end portions 90, 91 are connected to each other by ultrasonic welding or by heat staking to hold the clamshell container 60 in the closed condition. It will further be appreciated that the deployment end portions 90, 91 may also be connected by any other suitable means, such as mechanical fasteners or snap-fitted attachment with integrally formed mating features on the first and second halves 61, 62.

Figure 4:
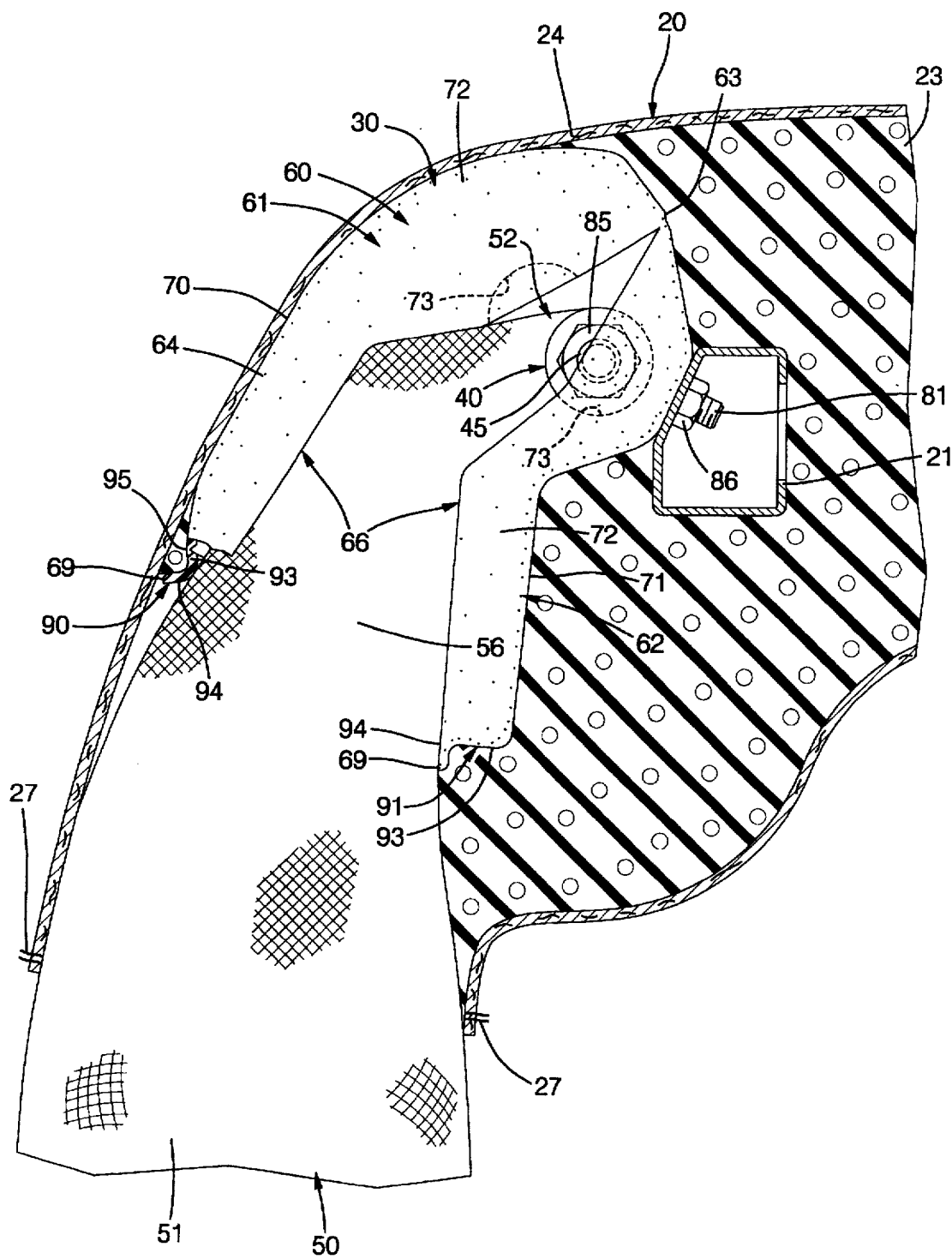
FIG. 4 is a section as viewed along line 4—4 of FIG. 2 and showing the air bag module in the deployed condition.

As best shown in FIGS. 3, 4 and 5, the clamshell container 60 includes a bendable, thin deployment hinge portion 95 pivotally connecting the first deployment end portion 90 to the first half 61 of the clamshell container 60. The deployment hinge portion 95 preferably permits pivotal movement of the first deployment end portion 90 approximately 90 degrees relative the outboard side wall 70 of the first half 61 of the clamshell container 60. Preferably the deployment hinge portion 95 extends along the entire height of the first half 61 of the clamshell container 60. However, it will be appreciated that the deployment hinge portion 95 may only partially extend along the height of the clamshell container 60, especially when the first half 61 has additional complex curvatures. As best shown in FIG. 5, the clamshell container 60 is preferably integrally molded as one piece in the open condition wherein the closure hinge portion 63 and the deployment hinge portion 95 are rotated open such that the clamshell container 60 has positive die angles for easy removal from the mold.

It is critical that the integral connection of the deployment hinge portion 95 to the first half 61 be stronger than the connection between the lip portions 94. Thus, upon air bag deployment, the lip portions 94 should separate from each other and the deployment hinge portion 95 should remain attached to the first half 61 of the clamshell container 60.

The entire clamshell container 60 is preferably integrally molded as a single component from a suitable polymeric material. Preferably, the clamshell container 60 is molded as a single component in the open condition as shown in FIG. 5. Advantageously, the clamshell container 60 is easily removable from the mold due to its generally planar, outwardly extending halves 61, 62 interconnected by the bendable closure hinge portion 63. The clamshell container 60 is also easily removable from the mold due to the deployment hinge portion 95 which permits the first deployment end portion 90 to be molded in a position with a positive die angle. It will further be appreciated that the deployment hinge portion 95 and the closure hinge portion 63 are each preferably formed as one integral piece with the clamshell container 60 as integral living hinges.

As best shown in FIG. 5, the module 30 preferably includes a mounting bracket 80 having a vertically elongated bracket portion 82 and laterally bent first and second apertured bracket ends 83, 84. The first apertured bracket end 83 is sized for receiving the plain end 42 of the inflator 40 therein and the second apertured bracket end 84 is sized for receiving the elongated inflator rod 45 of the inflator 40 therein. The mounting bracket 80 further includes a set of outwardly projecting mounting fasteners 81 connected to the elongated bracket portion 82 and spaced for alignment with the fastener apertures 74 in the second half 62 of the clamshell container 60. The mounting bracket 80 has a height less than that of the inflator 40 including the elongated inflator rod 45 such that the threaded end portion 46 of the elongated inflator rod 45 extends out beyond the second apertured bracket end 84 for attachment of an end nut 85 thereto to secure the mounting bracket 80 to the inflator 40. The mounting fasteners 81 of the mounting bracket 80 are suitably attached to any vehicle 12 structure, such as the seat frame 21 or a suitable projection welded to the seat frame 21. Thus, the entire module 30 can be easily removably mounted on the vehicle 12 by the use of the mounting bracket 80 with mounting fasteners 81 and secured in place, such as by mounting nuts 86.

Preferably, an apertured spacer 77 is sized for receiving the elongated inflator rod 45 therethrough and is positioned between the second apertured bracket end 84 and the discharge end 43 of the inflator 40 for positioning the mounting bracket 80 relative the inflator 40. Preferably, the spacer 77 has an upper tapered end 78 corresponding with an angled portion 87 on the elongated bracket portion 82. It will be appreciated that the spacer 77 including the tapered end 78 is disposed on the inflator 40 by slip-fitted connection, but could also be integrally formed on the inflator 40 or could threadably engage the inflator 40.

The tapered end 78 of the spacer 77 and the tapered second side opening 54 of the neck portion 52 of the air bag 50 cooperatively ensure proper assembly of the air bag 50 on the inflator 40 and cooperatively provide positive location of the air bag 50 on the inflator 40 during deployment as will now be described. To assemble the air bag 50 to the inflator 40, the tapered spacer 77 is slipped onto the elongated inflator rod 45 and then the elongated inflator rod 45, tapered spacer 77 and discharge end 43 of the inflator 40 must be axially inserted into the larger first side opening 53 of the neck portion 52 of the air bag 50. Insertion is continued until the tapered end 78 of the spacer 77 is tightly captured and positioned within the tapered second side opening 54 of the neck portion 52 of the air bag 50. The larger plain end 42 of the air bag 50 is sized larger than the tapered second side opening 54, thus ensuring that the air bag 50 cannot be attached to the inflator 40 upside down. While the air bag 50 shown in the drawings is generally symmetrical, this feature is especially useful with an air bag which is not generally symmetrical and which is also contemplated for use with this invention. Upon air bag deployment, the interference fit between the tapered second side opening 54 of the air bag 50 and the tapered end 78 of the spacer 77 of the inflator 40 maintains the proper location of the air bag 50 on the inflator 40 by reducing axial sliding movement of the air bag 50 relative the inflator 40 and also by reducing rotation of the air bag 50 about the inflator 40 during the discharge of inflator gas. The angled portion 87 on the mounting bracket 80 also additionally ensures proper installation of the mounting bracket 80 relative the air bag 50 and inflator 40 since the angled portion 87 of the mounting bracket 80 must be aligned with the tapered end 78 of the spacer 77 and closely captures the air bag 50 between the spacer 77 and angled portion 87 in the assembled condition described below.

Referring to FIGS. 5 and 6, the module 30 is assembled as follows. Initially, an air bag subassembly is assembled which preferably includes the air bag 50, the mounting bracket 80, the spacer 77, and the inflator 40. First, the elongated inflator rod 45 of the inflator 40 is axially slipped through the apertured spacer 77. Next, the inflator 40, with the elongated inflator rod 45 and spacer 77 leading, are slid through the first side opening 53 of the neck portion 52 of the air bag 50 until the tapered end 78 of the spacer 77 achieves an interference fit with the tapered second side opening 54, as described in detail above, and wherein the threaded end portion 46 of the elongated inflator rod 45 extends out beyond the second side opening 54 and the discharge end 43 of the inflator 40 is positioned within the neck portion 52 for discharging gas into the main body portion 51 of the air bag 50. Next, the first apertured bracket end 83 is axially slid up over the plain end 42 of the inflator 40 until the second apertured bracket end 84 is above the elongated inflator rod 45. Next the second apertured bracket end 84 is axially pushed onto the elongated inflator rod 45 of the inflator 40 until the second apertured bracket end 84 engages the spacer 77 to prevent the first apertured bracket end 83 from slipping off the plain end 42. Next, the end nut 85 is secured to the threaded end portion 46 of the elongated inflator rod 45 to securely attach and position the mounting bracket 80 relative the inflator 40 and air bag 50. It will further be appreciated that the first and second apertured bracket ends 83, 84 capture the air bag 50 therebetween to additionally position the air bag 50 relative the inflator 40. Finally, the air bag 50 is folded into a compact shape preferably including upper and lower longitudinally extending folds and a plurality of accordion-type pleat folds to complete the air bag subassembly.

The module 30 assembly is easily completed as follows. As best shown in FIG. 5, the clamshell container 60 is placed in the open condition and the mounting fasteners 81 on the mounting bracket 80 are matably aligned with the fastener apertures 74 on the second half 62 of the clamshell container 60. The air bag subassembly including the air bag 50, the inflator 40 and the mounting bracket 80, is placed into the second half 62 of the clamshell container 60 with the mounting fasteners 81 inserted out through the fastener apertures 74. It will be appreciated that the folded air bag 50, inflator 40 and mounting bracket 80 are easily placed within the clamshell container 60 in the open condition since the closure hinge portion 63 enables the first and second halves 61, 62 to be opened 180 degrees apart in a generally planar condition.

Next, the first half 61 of the clamshell container 60 is simply folded over approximately 180 degrees and positioned atop the second half 62 as shown in FIG. 6. The first deployment end portion 90 is folded over approximately 90 degrees and closed and matably aligned with the second deployment end portion 91 such that the lip portions 94 engage each other. To complete the module assembly, the lip portions 94 of the first and second deployment end portions 90, 91 are then releasably connected to each other, such as by ultrasonic welding, to maintain the clamshell container 60 in the closed condition until air bag deployment. In the closed condition, the clamshell container 60 maintains the air bag 50 in the folded condition. Also in the closed condition, the clamshell container 60 substantially encapsulates the air bag 50, inflator 40 and mounting bracket 80 and prevents entry of foreign articles into the module 30. As best shown in FIG. 6, the respective perimetric edges 66 including the hinged, end and deployment edges 67, 68, 69 of the first and second halves 61, 62 are aligned with each other and substantially abut each other when the clamshell container 60 is in the closed condition.

As best shown in FIG. 1, the module 30 may be attached to any suitable vehicle 12 structure and is particularly well-adapted for use in narrow vehicle locations with limited space such as the seat back 20 or seat bottom 19 or vehicle side structure. The module 30 is preferably attached to the seat frame 21 of the seat back 20 by simply securing the mounting fasteners to the seat frame 21, such as by use of mounting nuts 86.

Upon the sensing of predetermined vehicle 12 conditions, the inflator 40 generates inflator gas out through the ports 44 on the discharge end 43 and into the main body portion 51 of the air bag 50. The inflating air bag 50 forcibly breaks apart and separates the lip portions 94 of the first and second deployment end portions 90, 91 such that the air bag 50 can deploy between the first and second halves 61, 62 of the clamshell container 60. It is desirable that the deployment hinge portion 95 be stronger than the connection of the lip portions 94 such that the deployment hinge portion 95 does not tear open during air bag deployment. Thus, the thickness of the deployment hinge portion 95 and the ultrasonic welding, heat staking or other fastening of the lip portions 94 must be suitably tuned to obtain that objective.

As best shown in FIG. 3, during initial inflation the lip portions 94 break apart and the first deployment end portion 90 flaps open and rotates about the deployment hinge portion 95 outwardly towards the door 14, while the second deployment end portion 91 remains in generally the same position. Thus, the deployment end portions 90, 91 can advantageously be used to cooperatively bias and direct initial inflation of the air bag 50 outwardly towards the door 14. In addition, rotation of the first deployment end portion 90 about the deployment hinge portion 95 creates a greater air bag opening 56 through which the inflating air bag 50 can deploy. Upon further air bag 50 inflation, the first and second halves 61, 62 of the clamshell container 60 rotate partially open about the closure hinge portion 63 for deployment of the air bag 50 therebetween to the fully inflated condition shown in FIGS. 2 and 4. During air bag deployment, the interference fit between the tapered second side opening 54 of the air bag 50 and the tapered end 78 of the spacer 77 of the inflator 40 maintains the proper location of the air bag 50 on the inflator 40 by reducing axial sliding movement of the air bag 50 relative the inflator 40 and also by reducing rotation of the air bag 50 about the inflator 40 during the discharge of inflator gas.

Advantageously, the clamshell container 60 permits greater flexibility in packaging such that the clamshell container 60 can be sized to exactly fit the desired size and packaging of the folded air bag 50 and inflator 40 within a narrow vehicle 12 location. It will further be appreciated that the clamshell container 60 is easily molded due to the closure hinge portion 63 and the deployment hinge portion 95 which permit placement of the halves 61, 62 and the first deployment end portion 90, respectively, during molding to a position having a positive die angle for easy removal from the mold.

It will be understood that a person skilled in the art may make modifications to the preferred embodiment shown herein within the scope and intent of the claims. For example, although the clamshell container 60 is shown as having two generally half-cylindrical halves 61, 62, it will be appreciated that the first and second halves 61, 62 may be virtually any geometric shape. It will further be appreciated that while the closure hinge portion 63 and the deployment hinge portion 95 are preferably shown as one continuous strip, the closure and deployment hinge portions 63, 95 may also be discontinuous or may extend less than the height of the clamshell container 60 in the case of more complex curvatures. While the first deployment end portion 90 of the clamshell container 60 is preferably rotatable approximately 90 degrees about the deployment hinge portion 95, it will be appreciated that the first deployment end portion 90 may be rotatable more or less than 90 degrees depending on the amount of rotation desired for achieving a positive die angle and for directing the air bag 50. Although the preferred embodiment shows the mounting bracket 80 packaged within the clamshell container 60, it will be appreciated that the mounting bracket 80 could also be attached to the outside of the clamshell container 60 or that the inflator 40 and mounting bracket 80 could be positioned within the neck portion 52 of the air bag 50. It will further be appreciated that the mounting bracket 80 and spacer 77 could be eliminated and that the mounting fasteners 81 could be mounted directly on the inflator 40 and extend out through the air bag 50 and clamshell container 60 for attachment to the vehicle 12. While the preferred embodiment shows the spacer 77 located upward in the module 30, it will also be appreciated that the first and second side openings 53, 54 of the neck portion 52 could be switched and the tapered spacer 77 could be located towards the bottom of the module 30.

It will be appreciated that the closure hinge portion 63 and the deployment hinge portion 95 both advantageously enable easy positioning of the clamshell container 60 within the mold so that positive die angles can be achieved for ease of removal from the mold. It will further be appreciated that the clamshell container 60 may have additional living hinge portions positioned between the closure hinge portion 63 and the deployment edges 69 when needed for easy removal of the clamshell container 60 from the mold. Advantageously, the closure hinge portion 63 serves the additional purpose of permitting rotation of the first and second halves 61, 62 of the clamshell container 60 between the open and closed conditions for easy installation of the air bag subassembly. Also advantageously the deployment hinge portion 95 serves the additional purposes of permitting pivotal movement of the first deployment end portion 90 for flapping open to provide a wider air bag opening 56 through which the air bag 50 deploys and also for directing the deploying air bag 50. Thus, it will further be appreciated that the first and second deployment end portions 90, 91 may be a larger portion of the clamshell container 60 for providing an even wider air bag opening 56 and for providing additional guidance to the deploying air bag 50.

Figure 7:
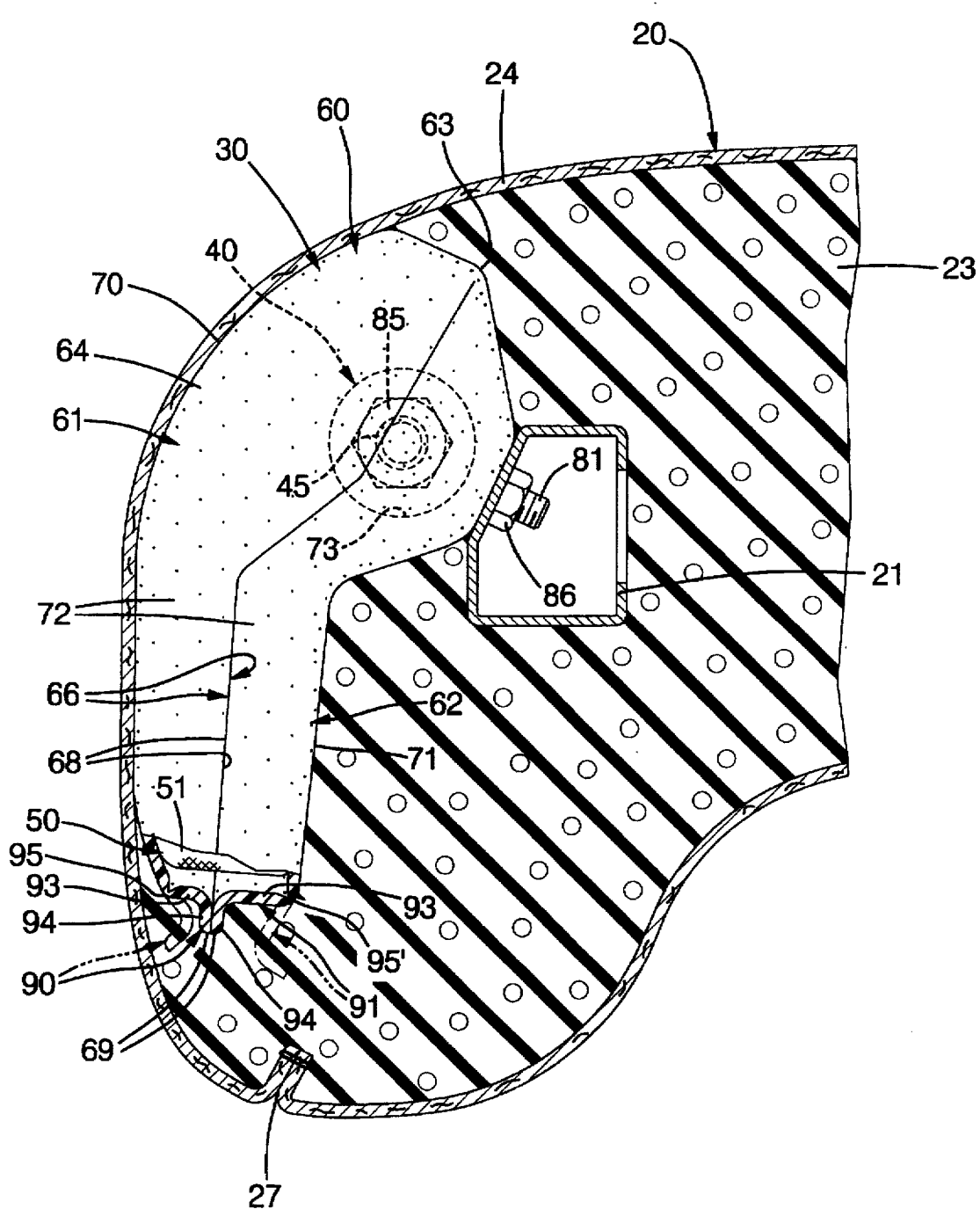
FIG. 7 is a section view similar to FIG. 3, but showing an alternate embodiment of the invention.

It will further be appreciated that the second deployment end portion 91 may be pivotally connected to the second half 62 of the clamshell container 60 in a similar manner to the first deployment end portion 90. FIG. 7 shows an alternate embodiment of the invention similar to that shown in FIGS. 1–6, with similar parts denoted by similar numerals. However, the clamshell container 60 includes an additional deployment hinge portion 95' which pivotally connects the second deployment end portion 91 to the second half 62 of the clamshell container 60.

While the present embodiment has been described as carried out in a specific embodiment thereof, it is not intended to be limited thereby, but is intended to cover the invention broadly within the scope and spirit of the claims.

What is claimed is:

1. An air bag module comprising:

an inflator for generating gas;

an air bag deployable upon generation of gas by the inflator: and a container housing the air bag and inflator therein, the container having walls defining a substantially enclosed volume, the container including first and second halves and a bendable closure hinge portion pivotally connecting the first and second halves and the container including an additional hinge portion located on one of the halves, the hinges enabling movement of the container between an open condition for receiving the air bag and inflator therein and a closed condition defining a substantially enclosed volume for housing the air bag and inflator.

2. An air bag module comprising:

an inflator for generating gas;

an air bag deployable upon generation of gas by the inflator; and a clamshell container having a first half and a second half pivotally connected to each other by a closure hinge portion, the clamshell container housing the air bag and inflator therein, the first and second halves of the clamshell container each including a deployment end portion opposite the closure hinge portion, the deployment end portions being releasably connected to each other such that upon air bag deployment, the deployment end portions break apart from each other to permit deployment of the air bag therebetween, at least one of the deployment end portions being hingedly connected to the clamshell container by a deployment hinge portion and the deployment hinge portion being stronger than the releasable connection between the deployment end portions whereby upon air bag deployment, the inflating air bag breaks apart the deployment end portions and the deployment hinge portion remains intact and permits rotation of the corresponding deployment end portion.

3. The module of claim 2 wherein the deployment end portions each include a laterally extending portion and an outwardly protruding lip portion.

4. The module of claim 2 wherein the deployment end portions are connected to each other by heat staking.

5. The module of claim 2 wherein the deployment end portions are connected to each other by ultrasonic welding.

6. An air bag module comprising:

an inflator for generating gas;

an air bag deployable upon generation of gas by the inflator; and a clamshell container having a first half and a second half pivotally connected to each other by a closure hinge portion, the clamshell container housing the air bag and inflator therein, the first and second halves each having a forward deployment edge pivotally connected thereto whereby upon air bag inflation the forward deployment edges rotate open for deployment of the air bag therethrough.

7. The air bag module of claim 6 wherein the first and second halves are shaped for closely capturing the inflator and air bag therein when the clamshell container is in a closed condition.

8. An air bag module comprising:

an inflator for generating gas;

an air bag deployable upon generation of gas by the inflator; and a clamshell container having a first half and a second half pivotally connected to each other by a closure hinge portion, the clamshell container housing the air bag and inflator therein, the first and second halves of the clamshell container each including a deployment edge opposite the closure hinge portion, the deployment edges of the clamshell container being releasably connected to each other such that upon air bag deployment, the air bag breaks open and deploys between the deployment edges of the clamshell container, and at least one of the deployment edges being hingedly connected to the corresponding one of the first and second halves of the clamshell container.

9. An air bag module comprising:

an air bag having a neck portion including axially aligned opposing first and second side openings, the second side opening being sized smaller than the first side opening; and an inflator having opposing first and second inflator ends, the first inflator end being sized larger than the second side opening and the second inflator end being in interference-fitted engagement with the second side opening, the second side opening being tapered and the second inflator end being tapered.

10. An air bag module comprising:

an inflator for generating gas;

an air bag deployable upon generation of gas by the inflator; and a clamshell container having a first half and a second half pivotally connected to each other by a closure hinge portion, the clamshell container housing the air bag and inflator therein, the first and second halves of the clamshell container each including a deployment end portion opposite the closure hinge portion, and at least one of the deployment end portions being hingedly connected to the corresponding one of the first and second halves of the clamshell container.

* * * * *